Sept. 6, 1932.  W. K. NELSON  1,875,644
APPARATUS FOR MAKING HEAT AND SOUND INSULATING PRODUCTS
Original Filed July 2, 1927  3 Sheets-Sheet 1
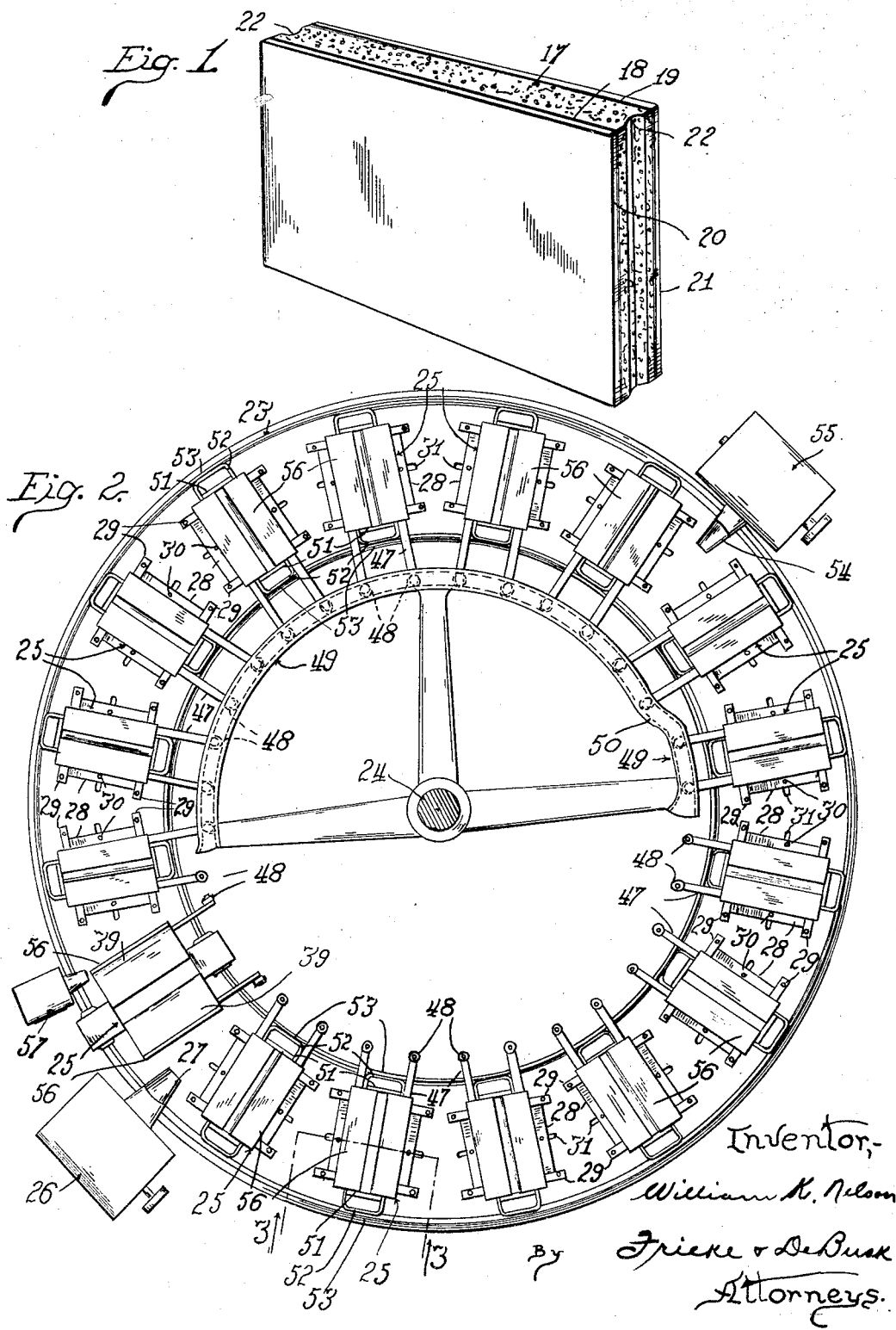

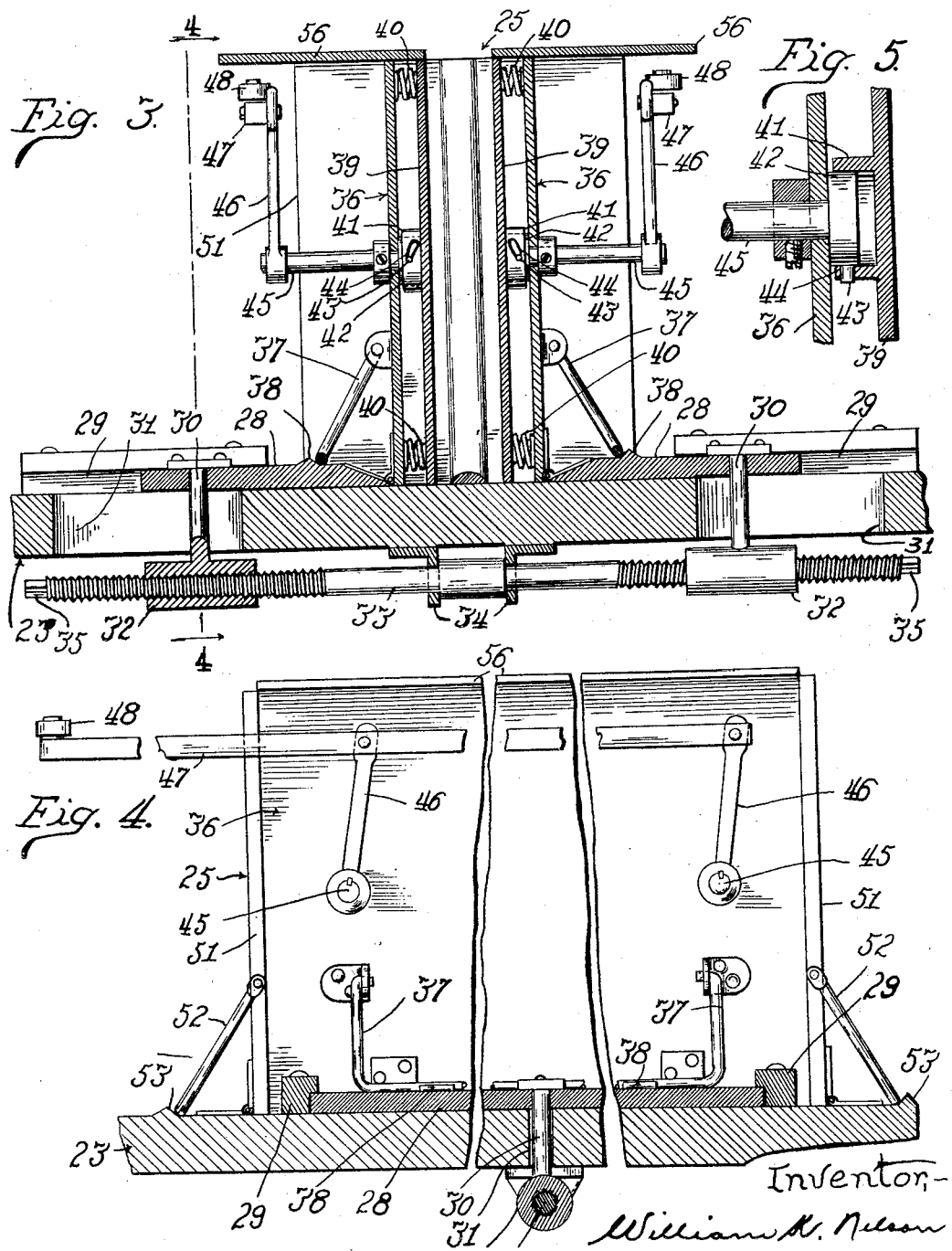

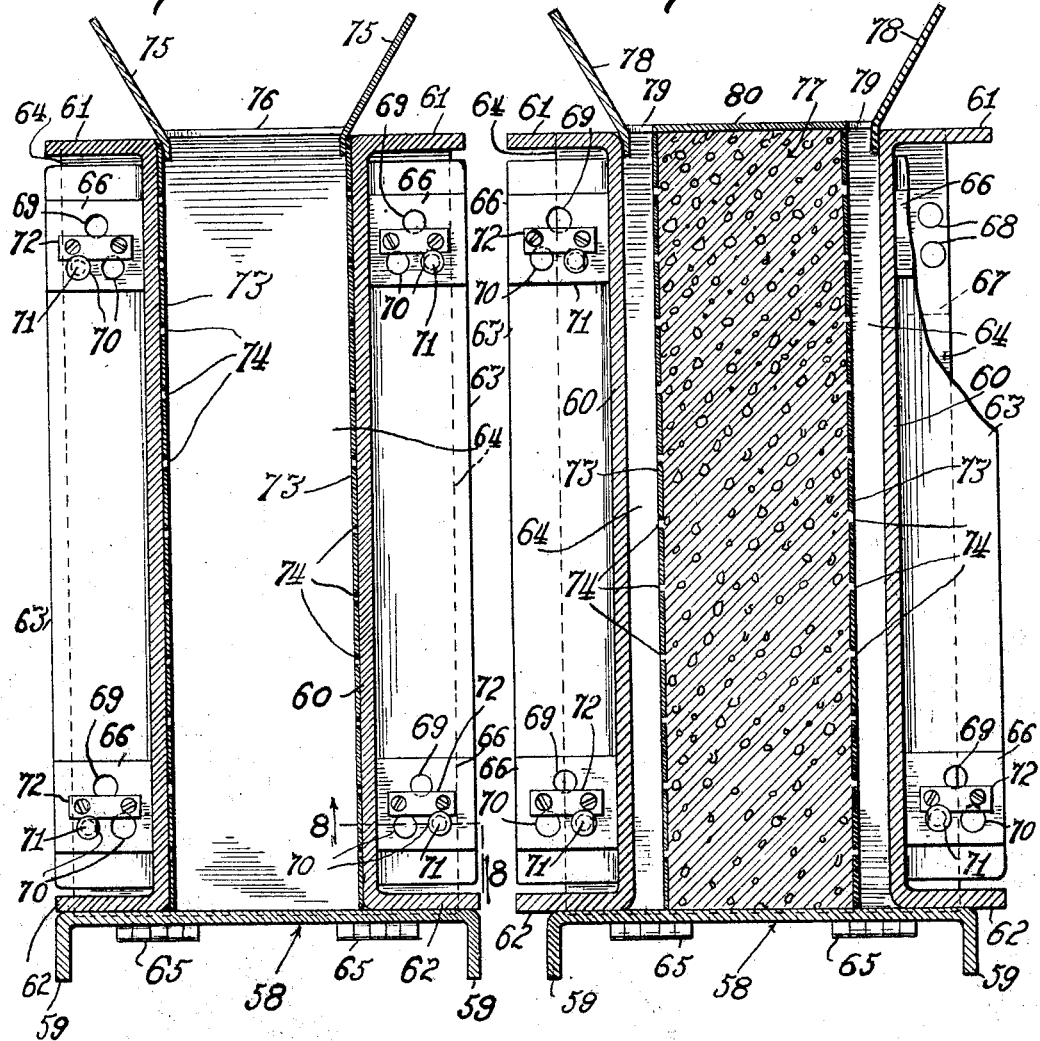

Patented Sept. 6, 1932

1,875,644

UNITED STATES PATENT OFFICE

WILLIAM K. NELSON, OF CHICAGO, ILLINOIS, ASSIGNOR TO UNIVERSAL GYPSUM & LIME CO., OF CHICAGO, ILLINOIS, A CORPORATION OF DELAWARE

APPARATUS FOR MAKING HEAT AND SOUND INSULATING PRODUCTS

Original application filed July 2, 1927, Serial No. 203,199. Divided and this application filed August 18, 1930. Serial No. 475,892.

My invention relates to apparatus for producing heat and sound insulating cast products.

This application is a division of my parent application Serial No. 203,199, filed July 2, 1927, on which my Patent 1,773,841 was granted on August 26, 1930.

My invention relates to a new and improved product made by a casting or molding operation in the form of a central body portion of cellular mineral matter which has been aerated materially so as to be of comparatively great porosity, with two outside body layers formed of a material of comparatively greater density or lesser porosity and with fibrous sheets of material interposed between the respective outside body layers and the central body portion.

The objects of my invention are to provide improved apparatus for producing the improved product; to provide apparatus which shall be adapted for use for producing products of different thicknesses by the use of the same molds; and to provide apparatus which shall be capable of use by a continuous process for producing blocks of the improved type indicated, such apparatus being preferably automatic in operation for producing the blocks to the best advantage.

The preferred means by which I have accomplished my several objects are disclosed in the specification by reference to the accompanying drawings. That which I believe to be new and desire to cover by Letters Patent is set forth in the claims.

In the drawings:—

Fig. 1 is a perspective view of my improved block;

Fig. 2 is a top plan view showing more or less diagrammatically one form of apparatus for producing my improved blocks;

Fig. 3 is a vertical sectional view on an enlarged scale, taken substantially at line 3—3 of Fig. 2;

Fig. 4 is a vertical sectional view taken at line 4—4 of Fig. 3;

Fig. 5 is an enlarged detail view, partly in section, showing one of the cam devices by which one of the adjustments of the mold is effected;

Fig. 6 is a vertical cross sectional view through a form of mold adapted for producing my improved block, being shown with two sheets of fibrous material therein and a funnel in position thereon ready for the initial pouring operation;

Fig. 7 is a view similar to Fig. 6 but showing the mold in changed condition ready for the second pouring operation for completing the partially formed block, and with a different form of funnel in position thereon; and Fig. 8 is an enlarged detail view, being a section on line 8—8 of Fig. 6.

Referring now to the form of block shown in Fig. 1, 17 indicates an intermediate layer of porous cellular material having sheets of paper or other fibrous material 18 and 19 adhering thereto upon its opposite faces, the layer 17 having been formed by casting between the sheets of fibrous material as hereinafter described. Upon the outer faces of the sheets of fibrous material 18 and 19 there are additional layers 20 and 21 of porous cellular material, these layers also being preferably cast in contact with the sheets 18 and 19, the sheets being preferably perforated at intervals for increasing the bonding effect and the perforations preferably being staggered so as to avoid material weakening of the sheets. The layers 20 and 21 are preferably similar to the layer 17 except that the material is preferably of considerably greater density than that of the body 17.

In the preferred form of cast product as shown in Fig. 1, the ends and one side of the block are provided with grooves 22 so as to provide a space between two abutting blocks into which a suitable binder can be poured for hardening therein for both keying the blocks together and for causing them to adhere to each other.

By the provision of the form of product as described comprising the intermediate sheets 18 and 19, there is a barrier between the air content of one of the body layers and the air content of the adjacent layer and the product thus produced has all the advantages set forth in my parent application.

Coming now to an improved form of apparatus for producing my improved product, as shown in Figs. 2 to 5 inclusive, 23 indicates a turn-table of any suitable type rotatable about a heavy shaft 24 by the application of power thereto in any suitable manner. The turn-table 23 is provided with a plurality of molds 25 upon its upper face, the machine of the construction shown being provided with sixteen of such molds. 26 indicates a mixing device of any suitable type driven by power from any suitable source and provided with a spout or chute 27 which overhangs the path of movement of the molds 25 upon the turn-table 23. With the turn-table being driven at suitable speed in counter-clockwise direction in Fig. 2, when each of the molds in turn is brought into position underneath the chute 27 a suitable amount of plastic material is delivered from the chute into the mold without stopping the movement of the turn-table. This is effected either manually or automatically as may be desired, the delivery being preferably effected by the use of a funnel of the type shown in Fig. 6, such funnel also serving to hold the sheets of fibrous material in position in the mold.

The plastic material to be employed for the body of the block is preferably in the form of an unstable mass of plastic material of a type adapted to aerate and form a cellular texture and then to harden in cellular condition. For a material weighing approximately 15 pounds per cubic foot, I have used the following ingredients,—1000 pounds of stucco (calcined gypsum) of average good grade, 90 pounds of aluminum sulphate containing water of crystallization, 35 pounds of calcium carbonate, 20 pounds of talc, 25 ounces of commercial retarder, and 6 pounds of potassium sulphate, all of such ingredients being finely ground and thoroughly mixed in a dry state and then added to a suitable quantity of water at the time of use.

As the turn-table continues to move in counter-clockwise direction after the pouring operation, the hardening of the cellular mass proceeds, the rate of movement of the turn-table being such that by the time the table has made approximately half of a complete rotation the material has hardened sufficiently to hold its form.

Referring now to Figs. 3, 4 and 5 which show the form of mold employed, 28 indicates one of a pair of slide blocks which are secured in spaced relation to each other upon the upper face of the turn-table 23, each of said slide blocks 28 being slidably mounted between undercut cleats 29, as is best shown in Fig. 4. Each of the slide blocks 28 is provided with a depending rod or bar 30 which extends downwardly through a slot 31 in the turn-table 23, such rod or bar being provided upon its lower end with a sleeve 32. The sleeves 32 of the two slide blocks 28 of each mold are connected to each other by means of a rod 33 reversely threaded at its end portions for engagement with the sleeves 32 of the slide blocks which are correspondingly threaded, the bar 33 being held rotatably in position with respect to the table 23 by means of a bracket 34 engaging an intermediate portion of the rod. By a rotation of the rod 33 by means of a suitable wrench engaging a head 35 upon its outer end, the slide plates 28 of the mold are moved toward or from each other as may be desired.

Each of the slide blocks 28 has hingedly mounted thereon a side wall member 36 which is releasably held in position with respect to the slide block 28 by means of a link 37 hingedly connected with the side wall member and engaging stop members 38 carried by the slide block.

Each of the side wall members 36 is provided with an adjustable face portion 39 which is yieldingly held by means of springs 40 in spaced relation with respect thereto. Means is provided for moving the face portion 39 of the side wall member toward the portion 36 against the action of the springs 40. In the construction shown this means comprises a sleeve 41 carried upon the face of the member 39 adjacent to the portion 36, within which sleeve is rotatably mounted a head 42 which is provided with a pin 43 which engages a diagonally disposed slot 44 in the sleeve 41. The head 42, which is rotatably connected with the portion 36 of the side wall member is provided with a horizontally disposed shaft 45 which is provided upon its outer end with an upwardly extending arm 46. The sleeve and head construction as above described is located at one end of the side wall portion, with a duplicate structure at the opposite end, the upper ends of the arms 46 being pivotally connected by means of a link 47 as best shown in Fig. 4. Upon the inner end of the link 47, I have provided a roller 48 which is adapted in the continued rotation of the turn-table to come into engagement with a guide member 49 held in rigid position above the turn-table. When the mold reaches a position at substantially 180° from the position of the mixer 26, each of the rollers 48 in turn is brought into engagement with a cam portion 50 of the guide 49 serving to move the link 47 toward the left in Fig. 4 for swinging the arms 46 and the shaft 45 in counter-clockwise direction in said Fig. 4 for causing the pin 43 by engagement with the slot 44 of the drum to move the portion 39 of the side wall member toward the portion 36 against the action of the springs 40. The amount of throw of the diagonally disposed slot 44 of the drum 41 is such as to give the side wall portion 39 a movement corresponding in extent to the desired thickness of the outer face portions of the block to be cast. The arrangement is such that the cam 50 serves to give the face portions 39 of the side wall members the desired movement toward the side wall portions 36 independently of the adjusted positions of such members 36 as they are spaced at different distances apart by the use of the threaded bars 33.

At opposite ends of the side wall members, I have hingedly mounted end wall members 51, as is best shown in Fig. 4. These end wall members are hingedly mounted directly upon the turn-table, being held releasably in upright position thereon by means of pivotally mounted links 52 which are adapted by engagement with stop members 53 to hold the end walls in engagement with the ends of the side walls of the mold. The stop members 53 are preferably in the form of rings extending about the turn-table 23.

When in the movement of the turn-table 23 the rollers 48 of each mold in turn are brought into engagement with the cam portion 50 of the guide 49, the inner face portions of the side wall members are moved outwardly into spaced relation to the block which by that time is in condition to hold its shape, the side wall members 36 being readily movable out of contact with the sheets of fibrous material, the partially formed block being held in centered position in the mold by its engagement with the bottom and end walls of the mold. The mold is then carried in the continued rotation of the turn-table under the chute 54 of a second mixing device 55 also driven by power from any suitable source. Through the chute 54, there is delivered to the mold upon opposite faces of the partially formed block and between the sheets of fibrous material and the adjusted inner face portions of the side walls of the mold a second supply of plastic material, the delivery of the material to the mold being controlled manually or automatically as may be desired. Plates 56 are preferably carried by the side wall members 39 at their upper edges for assisting in directing the material from the chute 54 to the space at opposite sides of a partially formed block, and a funnel of the form shown in Fig. 7 may be employed.

The plastic material to be employed for the outer layers of the block is preferably of the same cellular texture as that of the interior body portion except that the ingredients are changed so as to form a considerably stronger and denser product. The material is preferably in the form of an unstable mass of plastic material of a type adapted to aerate and form a cellular texture and then to harden in cellular condition. For a material weighing approximately 32 pounds per cubic foot, I have used the following ingredients,—1000 pounds of stucco (calcined gypsum) of average good grade, 15 pounds of magnesium fluo silicate containing water of crystallization, 15 pounds of calcium carbonate, 3 pounds of commercial retarder, 16 pounds of potassium sulphate, and 6 pounds of hydrated lime, all of such ingredients being finely ground and thoroughly mixed in a dry state and then added to a suitable quantity of water at the time of use.

As the turn-table 23 continues its rotation in counter-clockwise direction, the side wall members 39 are held continuously in spaced relation with respect to the partially formed block against the action of the springs 40 by means of the guide 49 which extends about the path of the mold to a point at which the facing portions of the block will have become hardened sufficiently for holding their form, such point, in the construction shown, being in fairly close proximity to the mixer 26 by which the material for the next succeeding block is delivered in the manner already described. When the rollers 48 have passed out of engagement with the guide 49, at a time when the face portions have become partially hardened as above described, the swinging links 37 and 52 are released from engagement with their corresponding stop means, and the end walls 51 and the side walls of the mold are both turned downwardly upon their hinge connections out of contact with the block within the mold. The block is then removed and the mold is prepared for the succeeding casting operation. The operation of removing the block from the mold and of preparing the mold for another casting operation may be effected either manually or by suitable power means as may be desired. After the end and side wall members of the mold have been spread downwardly with respect to each other and the block has been removed from the mold, a suitable supply of grease is sprayed or otherwise applied upon the inner faces of the wall members, this being effected preferably by the use of a grease spraying device 57 of any suitable type. After the inner faces of the end and side wall members have been properly greased, the members are again raised into operative relation to each other, being held by the links 37 and 52, and the sheets of fibrous material are secured in position upon the inner faces of the parts 38 ready for the succeeding casting operation upon the continued rotation of the turn-table 23. The sheets of fibrous material (the parts 18 and 19 of the block of Fig. 1) are secured in position in any suitable manner upon the inner faces of the side walls of the mold so as to be held in position therein but so as to permit the side wall portions 39 to move out of contact therewith when such side wall members are moved outwardly by the cam portion 50 of the guide as above described.

I do not wish to be restricted to the use of any particular form of grease for the preparation of the mold for the casting operation. I have found in practice that very good results are attained with respect to the release of the mold parts from the hardened cast product and also with respect to the preservation of the color of the product by the use of a grease comprising three parts of castor oil and one part of kerosene.

The block shown in the drawings is preferably thirty inches long, twelve inches wide and from two to six or eight inches thick, though I do not limit the invention to such size or shape of product.

I have found in practice that blocks can be produced satisfactorily upon a commercial basis by the use of a number of molds of comparatively simple construction without the employment of a machine of the type described. A mold of this type is illustrated in Figs. 6, 7 and 8 in which the base of the mold is in the form of a piece of sheet metal 58 of brass or other suitable material, the base as illustrated being provided with turned edge portions 59 serving as supports. Slidably mounted on the base 58, are two side wall members 60, also made of sheet metal in the form illustrated, being provided with strengthening flanges 61 at their upper edges, with supporting base flanges 62 along their bottom edges and with parallel end flanges 63 at their end portions. The base flanges 62 are of such width as to afford a stable support for the side wall members upon the base 58, as well as to provide a close joint between the side wall members and the base.

At each end of the mold, there is mounted an end wall member 64 also in the form of a sheet of metal, pivotally connected at its lower edge with the base 58 by means of hinges 65, so as to fit snugly against the ends of the side wall members 60 when in their raised position and so as to be movable readily out of contact with the side wall members.

In the construction shown, each of the end flanges 63 is provided with two blocks 66 rigidly secured thereon, oppositely disposed with respect to blocks 67 rigidly mounted on the outer faces of the end wall members 64, four of such blocks 66 being provided on each of said members 64. Each of the blocks 67 and the adjacent portion of the end wall member is provided with two openings 68, one above the other, as is indicated in Fig. 7 at the point where a portion of one of the flanges 63 is broken away. Each of the blocks 66 and the adjacent portion of the flange 63 is provided with an opening 69 at the same level as that of the upper opening 68, and with two openings 70 at the same level as that of the lower opening 68, the openings 70 in the construction shown being one inch apart from center to center. A pin 71 is provided for each corner of each end wall member 64, the arrangement in the construction shown being such that when the pins 71 pass through the openings 68 and the outer openings 70 side wall members will be held at a distance of two inches from each other; that when the pins 71 pass through the openings 68 and 69 the side wall members will be held at a distance of three inches from each other; and that when the pins pass through the openings 68 and the inner openings 70 the side wall members will be held at a distance of four inches from each other.

In the construction shown, the pins 71 are secured in position so as to be readily removable. Each of the pins is provided with a circumferential groove at the end, being cut away at one side so as to permit the pin to pass a plate 72 carried by the block 66, the pin being secured in position in engagement with the plate 72 by a partial rotation of the pin.

With the members 60 secured in position at a distance of two inches apart, and with the parts properly greased, two sheets of paper or other fibrous material 73 are slipped into position in contact with the faces of the members 60, such sheets of paper being provided preferably with staggered perforations 74 therethrough. A funnel is then preferably placed in position, serving to hold the sheets of fibrous material in position as illustrated in Fig. 6, such funnel comprising side wall members 75 connected at their ends by bars 76. With the parts in the positions as above specified, the body of the block is poured and is given an opportunity to harden sufficiently to hold its form. The upper edge of the block is then dressed off even with the upper edges of the mold, after which the pins 71 are removed for enabling the side wall members to be moved into spaced relation with respect to the partially formed block, the block being held in position in the mold by its engagement with the bottom wall thereof. In Fig. 7, the partially formed block is indicated by the numeral 77. In the preferred form of practice of my invention for ordinary purposes, the side wall members will be spaced at a distance of one-half inch from the partially formed block at each face thereof. A different form of funnel will then be placed in position, comprising side wall portions 78 connected at their ends by bars 79 which in turn are connected by an intermediate longitudinally extending strip 80, this construction serving to permit material to be poured at each side of the partially formed block while at the same time protecting the edge of the block. After the second pouring operation and the hardening of the block sufficiently for holding its shape, the material is again trimmed off even with the upper edges of the side wall members, and the block is removed from the mold.

While I prefer to employ some such structure as that disclosed by my drawings and as above described, I wish to have it understood that I do not desire to limit my invention to the particular forms of apparatus as shown, except so far as certain of the claims are specifically so limited, since it is evident that changes might well be made without departing from the spirit of my invention.

I claim:—

1. An apparatus for making a heat and sound insulating product, comprising in combination a bottom member, end wall members pivotally mounted on said bottom member on axes at a fixed distance apart, side wall members between said end wall members and abutting at their ends against said end wall members and adjustable between the end wall members toward and from each other for the production of products of different thicknesses, and means for holding said wall members releasably in cooperative relation for the formation of a block.

2. An apparatus for making a heat and sound insulating product comprising in combination a bottom member, end walls pivotally mounted on said bottom member, side walls pivotally mounted at their lower ends above said bottom member in adjustably spaced relation between the end walls, swinging links carried by said walls on their outer faces, and means adapted by engagement with said links to hold said walls releasably in operative position.

3. An apparatus for making a heat and sound insulating product comprising in combination a bottom member, end walls pivotally mounted on said bottom member, blocks slidably mounted on said bottom member, side walls pivotally mounted on said slidably mounted blocks and extending from one to the other of said end walls, links pivotally mounted on the outer faces of said side walls, means carried by said slide blocks adapted by engagement with the links to hold said side walls releasably in operative position, and other releasable means for holding the end walls in operative position against the ends of said side walls.

4. An apparatus for making a heat and sound insulating product, comprising in combination a bottom member, end walls pivotally mounted on said bottom member, side walls pivotally mounted at their lower ends above said bottom member in adjustably spaced relation between the end walls, and means adapted automatically when the walls are brought to their raised position to hold the walls releasably in such raised position.

5. An apparatus for making a heat and sound insulating product, comprising in combination a bottom member, end walls pivotally mounted on said bottom member, side walls pivotally mounted at their lower ends above said bottom member in adjustably spaced relation between the end walls, and means for holding each of said walls in operative raised position independently of the other walls.

6. An apparatus for making a heat and sound insulating product, comprising in combination a bottom member, end walls pivotally mounted on said bottom member, side walls pivotally mounted at their lower ends above said bottom member in adjustably spaced relation between the end walls, stop members in outwardly spaced relation with respect to at least three of said walls, and horizontally pivoted members carried by said walls on their outer faces adapted normally in oblique position to engage said stop members when the walls are in raised position for holding said walls releasably in said raised position.

7. An apparatus for making a heat and sound insulating product comprising in combination a bottom member, oppositely disposed end walls pivotally mounted on fixed axes on said bottom member in spaced relation to each other, slide blocks movably mounted on said bottom member in spaced parallel position with respect to each other, and side walls pivotally mounted on said slide blocks and extending from one to the other of said end walls.

8. An apparatus for making a heat and sound insulating product comprising in combination a bottom member, oppositely disposed end walls pivotally mounted on fixed axes on said bottom member in spaced relation to each other, slide blocks movably mounted on said bottom member in spaced parallel position with respect to each other, side walls pivotally mounted on horizontal axes at the inner edges of said slide blocks and extending from one to the other of said end walls, and means carried by said side walls adapted by engagement with said slide blocks respectively for holding said side walls releasably in raised position.

9. An apparatus for making a heat and sound insulating product comprising in combination a bottom member, oppositely disposed end walls pivotally mounted on fixed axes on said bottom member in spaced relation to each other and adapted to swing outwardly, side walls pivotally mounted at their lower ends above said bottom member in adjustably spaced relation between the end walls and each comprising an outer member and a facing member in adjustably spaced relation to each other, and means for holding at least three of said walls releasably in raised position.

10. An apparatus for making a heat and sound insulating product comprising in combination a bottom member, oppositely disposed end walls pivotally mounted on fixed axes on said bottom member in spaced relation to each other and adapted to swing outwardly, side wall members pivotally mounted at their lower ends above said bottom member in adjustably spaced relation between the end walls, facing members in inwardly spaced relation to said side wall members, yielding means for pressing said facing members inwardly away from the side walls, means for moving said facing members outwardly toward said side walls against the action of said yielding means, and means for holding at least three of said walls releasably in raised position.

11. An apparatus for making a heat and sound insulating product comprising in combination a bottom member, oppositely disposed end walls pivotally mounted on fixed axes on said bottom member in spaced relation to each other and adapted to swing outwardly, side wall members pivotally mounted at their lower ends above said bottom member in adjustably spaced relation between the end walls, facing members in inwardly spaced relation to said side wall members, yielding means for pressing said facing members inwardly away from the side walls, means for moving said facing members outwardly toward said side walls against the action of said yielding means, outwardly extending rock shafts carried by said side walls and connected with said moving means for operating them, and means for holding at least three of said walls releasably in raised position.

12. An apparatus for making heat and sound insulating cast products, comprising in combination a travelling carrier, a plurality of molds on said carrier, means at one stage of the travel for delivering into each of said molds in turn an unstable mass of plastic porous material aerated to form a cellular texture and adapted to remain in a stable cellular condition, means for spacing the side walls of each of said molds in turn from the partially formed product after the material is in condition to hold its form, and means at another stage of the travel for delivering into each of said molds in turn on the opposite sides of the partially formed product additional unstable masses of plastic porous material aerated to form a cellular texture and adapted to remain in a stable cellular condition.

13. An apparatus for making heat and sound insulating cast products, comprising in combination a travelling carrier, a plurality of molds on said carrier, means at one stage of the travel for delivering into each of said molds in turn an unstable mass of plastic porous material aerated to form a cellular texture and adapted to remain in a stable cellular condition, means adapted automatically at a later stage of the travel to space the side walls of each of the molds in turn from the partially formed block after the mass is in condition to hold its form, and means at another stage of the travel for delivering into each of said molds in turn at the opposite faces of the partially formed cast product additional unstable masses of plastic porous material aerated to form a cellular texture and adapted to remain in a stable cellular condition.

14. An apparatus for making heat and sound insulating blocks, comprising in combination a continuously driven turn-table, a plurality of molds arranged about said turn-table, means for applying a thin film of grease to the inside faces of the walls of each mold in turn as it reaches a predetermined position in its movement, means for delivering to each mold in turn as it reaches a second predetermined position an unstable mass of plastic porous material aerated to form a cellular texture and adapted to remain in a stable cellular condition, means for spacing the side walls of each of said molds in turn from the partially formed block after the plastic material is in condition to hold its form, and means for delivering to each mold in turn at the opposite faces of the partially formed block as the mold reaches a third predetermined position additional unstable masses of plastic porous material aerated to form a cellular texture and adapted to remain in a stable cellular condition.

15. An apparatus for making a heat and sound insulating product, comprising in combination a bottom member, end walls pivotally mounted on said bottom member, side walls pivotally mounted at their lower ends above said bottom member in adjustably spaced relation between the end walls, means adapted by an adjustment to move said side wall members simultaneously toward and from centered position between said end wall members, and means for holding said wall members releasably in cooperative relation for the formation of a block.

16. An apparatus for making a heat and sound insulating product comprising in combination a bottom member, oppositely disposed end walls pivotally mounted on fixed axes on said bottom member in spaced relation to each other, slide blocks movably mounted on said bottom member in spaced parallel position with respect to each other, means mounted below said bottom member and extending upwardly through openings therein adapted by an adjustment to move said slide blocks simultaneously toward and from centered position between said end walls, and side walls pivotally mounted at their lower edges on said slide blocks and extending from one to the other of said end walls.

17. An apparatus for making a heat and sound insulating product, comprising in combination a bottom member, end wall members pivotally mounted on said bottom member on axes at a fixed distance apart, side wall members between said end wall members and abutting at their ends against said end wall members and adjustable between the end wall members toward and from each other for the production of products of different thicknesses, and means for releasably connecting said side wall members with said end wall members for holding the walls in their adjusted raised position.

18. An apparatus for making a heat and sound insulating product, comprising in combination a bottom member, end wall members pivotally mounted on said bottom member on axes at a fixed distance apart, side wall members between said end wall members and abutting at their ends against said end wall members and adjustable between the end wall members toward and from each other for the production of products of different thicknesses, outwardly projecting flanges carried by said side wall members at their opposite ends, and means for releasably connecting said flanges with said end wall members for holding the walls in their adjusted raised position.

19. An apparatus for making a heat and sound insulating product, comprising in combination a bottom member in the form of a plate of sheet metal having its side portions turned downwardly in the form of supporting flanges, end walls pivotally mounted at their lower ends on said bottom member on axes at a fixed distance apart, side wall members in the form of plates of sheet metal having their lower edges turned outwardly to provide supporting bases so as to be adjustable between the end wall members toward and from each other and having outwardly projecting flanges at their opposite ends abutting against said end wall members, and means for releasably connecting said end flanges of the side wall members with the end walls for holding the walls in their adjusted raised position.

20. An apparatus for making a heat and sound insulating product, comprising in combination a bottom member in the form of a plate of sheet metal having its side portions turned downwardly in the form of supporting flanges, end walls pivotally mounted at their lower ends on said bottom member on axes at a fixed distance apart, side wall members in the form of plates of sheet metal having their lower edges turned outwardly to provide supporting bases so as to be adjustable between the end wall members toward and from each other and having outwardly projecting flanges at their opposite ends abutting against said end wall members, and bolts releasably mounted in openings through the end walls and engaging selected ones of plural openings in the end flanges of said side wall members for holding the walls in adjusted raised position.

WILLIAM K. NELSON.